(12) United States Patent
Azuma

(10) Patent No.: US 12,717,415 B2
(45) Date of Patent: Aug. 25, 2026

(54) IMAGE PROCESSING DEVICE AND IMAGE PROCESSING METHOD

(71) Applicant: CANON KABUSHIKI KAISHA, Tokyo (JP)

(72) Inventor: Katsuhiko Azuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/967,017

(22) Filed: Dec. 3, 2024

(65) Prior Publication Data

US 2025/0190056 A1 Jun. 12, 2025

(30) Foreign Application Priority Data

Dec. 8, 2023 (JP) ................................ 2023-207851

(51) Int. Cl.
*G06F 3/01* (2006.01)

(52) U.S. Cl.
CPC .................................... *G06F 3/016* (2013.01)

(58) Field of Classification Search
CPC .... G06F 3/016; G06F 2203/014; G06F 3/005; H04N 23/68; H04N 9/3194
See application file for complete search history.

(56) References Cited

U.S. PATENT DOCUMENTS 9,196,134 B2 * 11/2015 Levesque ................. G08B 6/00
2019/0180479 A1 * 6/2019 Tokuchi ................ G06T 11/001

FOREIGN PATENT DOCUMENTS

WO 2021009864 A1 1/2021

* cited by examiner

*Primary Examiner* — Scott D Au
(74) *Attorney, Agent, or Firm* — Canon U.S.A., Inc., IP Division

(57) ABSTRACT

An image processing device is provided that edits moving image data with which haptics data for eliciting haptic sensation is associated. The image processing apparatus detects whether or not first and second haptics data respectively associated with first and second sections that are adjacent in a time direction in edited moving image data vary discontinuously. If it is detected that the first and second haptics data vary discontinuously, the first and second haptics data are modified so as to suppress the discontinuous variation.

13 Claims, 7 Drawing Sheets

100
101
CPU
102
ROM
103
RAM
104
MEDIUM CONTROL UNIT
105
STORAGE MEDIUM
106
OPERATION UNIT
111
IMAGE DATA EDITING UNIT
107
AUDIO DATA EDITING UNIT
108
HAPTICS DATA EDITING UNIT
109
HAPTICS DATA VARIATION DETECTION UNIT
110
DISPLAY UNIT
112
HAPTICS DEVICE CONNECTION UNIT
113

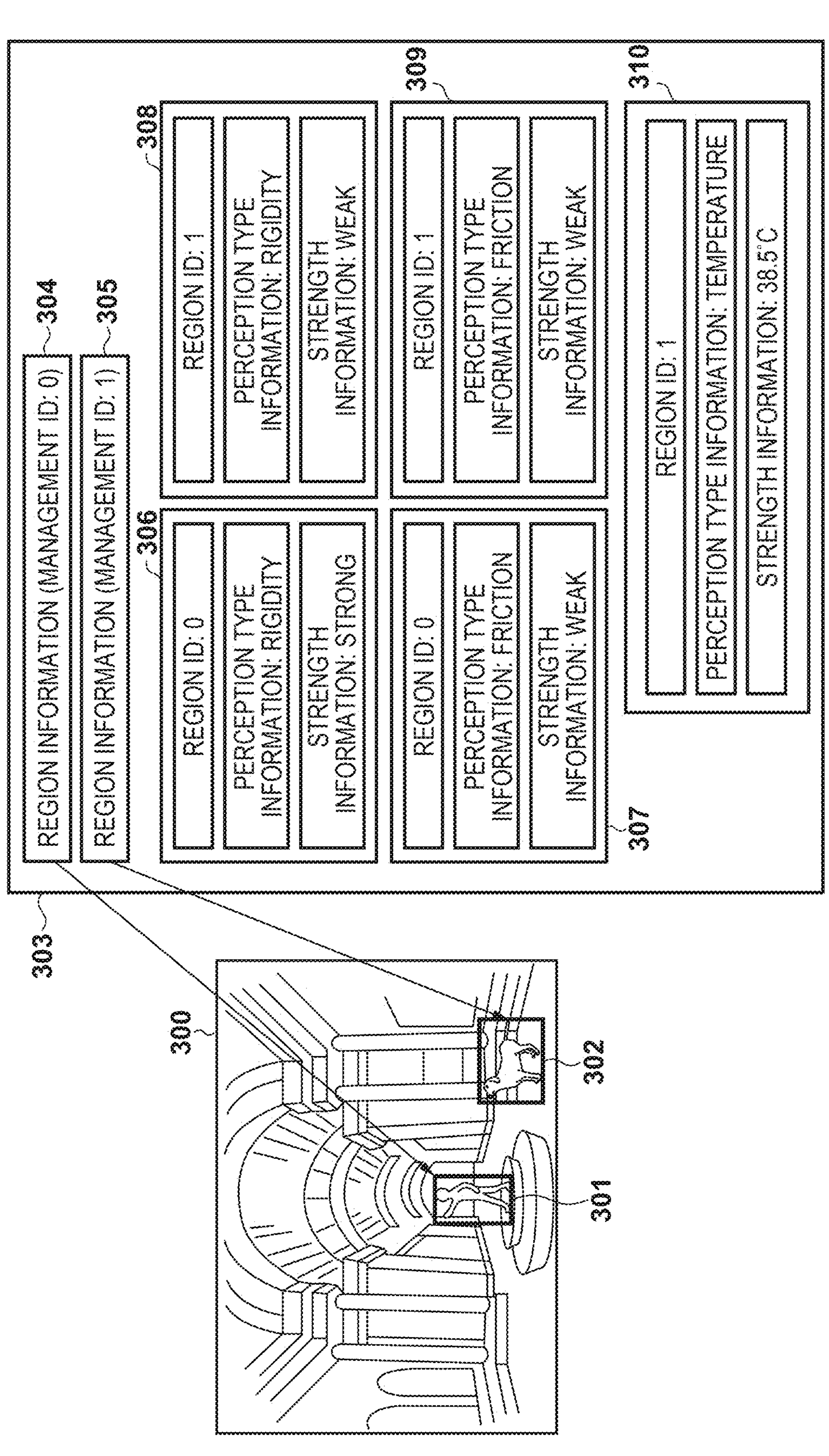
F I G. 3
300
301
302
303
304
305
306
307
308
309
310
REGION INFORMATION (MANAGEMENT ID: 0)
REGION INFORMATION (MANAGEMENT ID: 1)
REGION ID: 0
PERCEPTION TYPE INFORMATION: RIGIDITY
STRENGTH INFORMATION: STRONG
REGION ID: 1
PERCEPTION TYPE INFORMATION: RIGIDITY
STRENGTH INFORMATION: WEAK
REGION ID: 0
PERCEPTION TYPE INFORMATION: FRICTION
STRENGTH INFORMATION: WEAK
REGION ID: 1
PERCEPTION TYPE INFORMATION: FRICTION
STRENGTH INFORMATION: WEAK
REGION ID: 1
PERCEPTION TYPE INFORMATION: TEMPERATURE
STRENGTH INFORMATION: 38.5°C F I G. 6
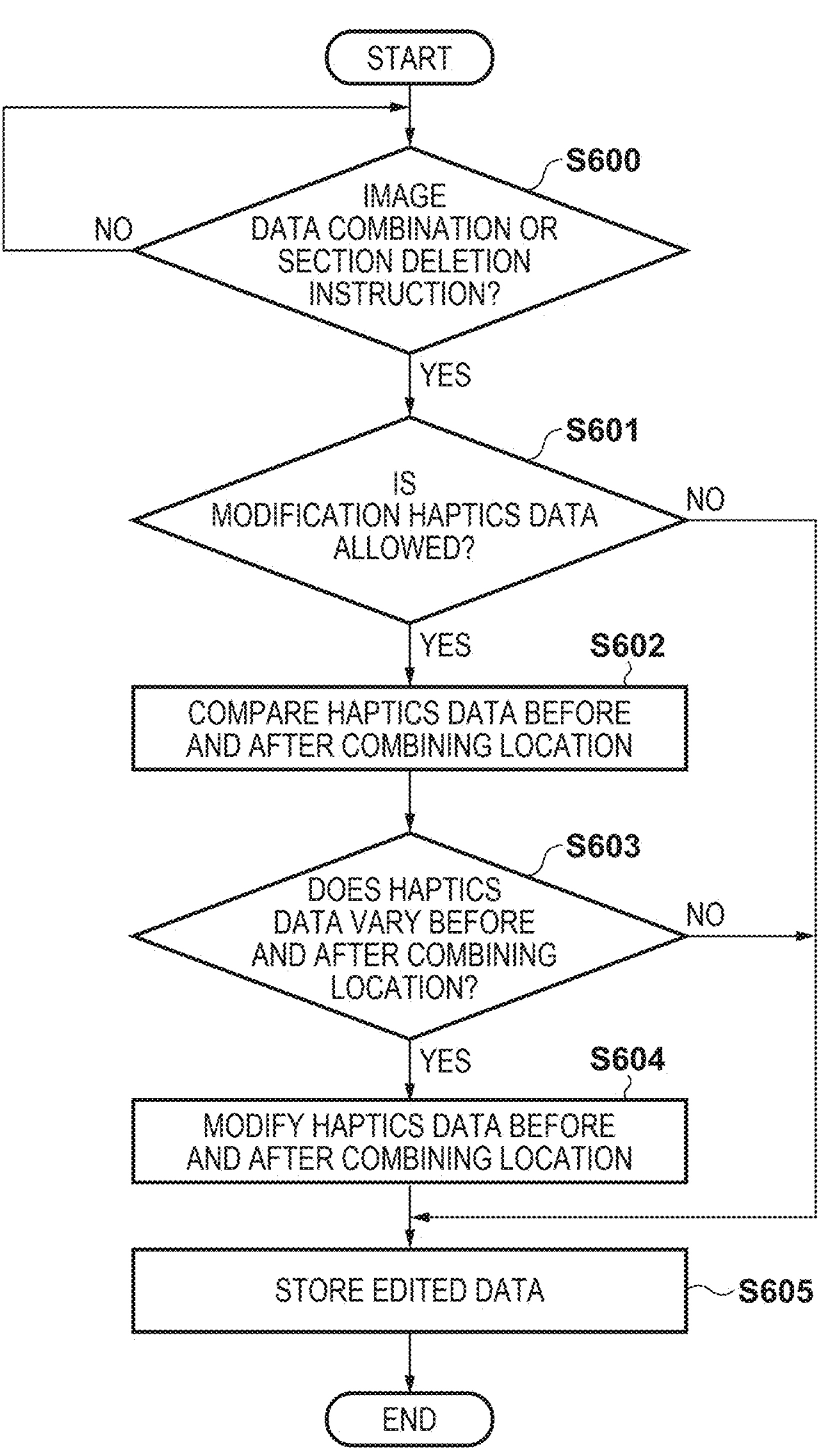

F I G. 7
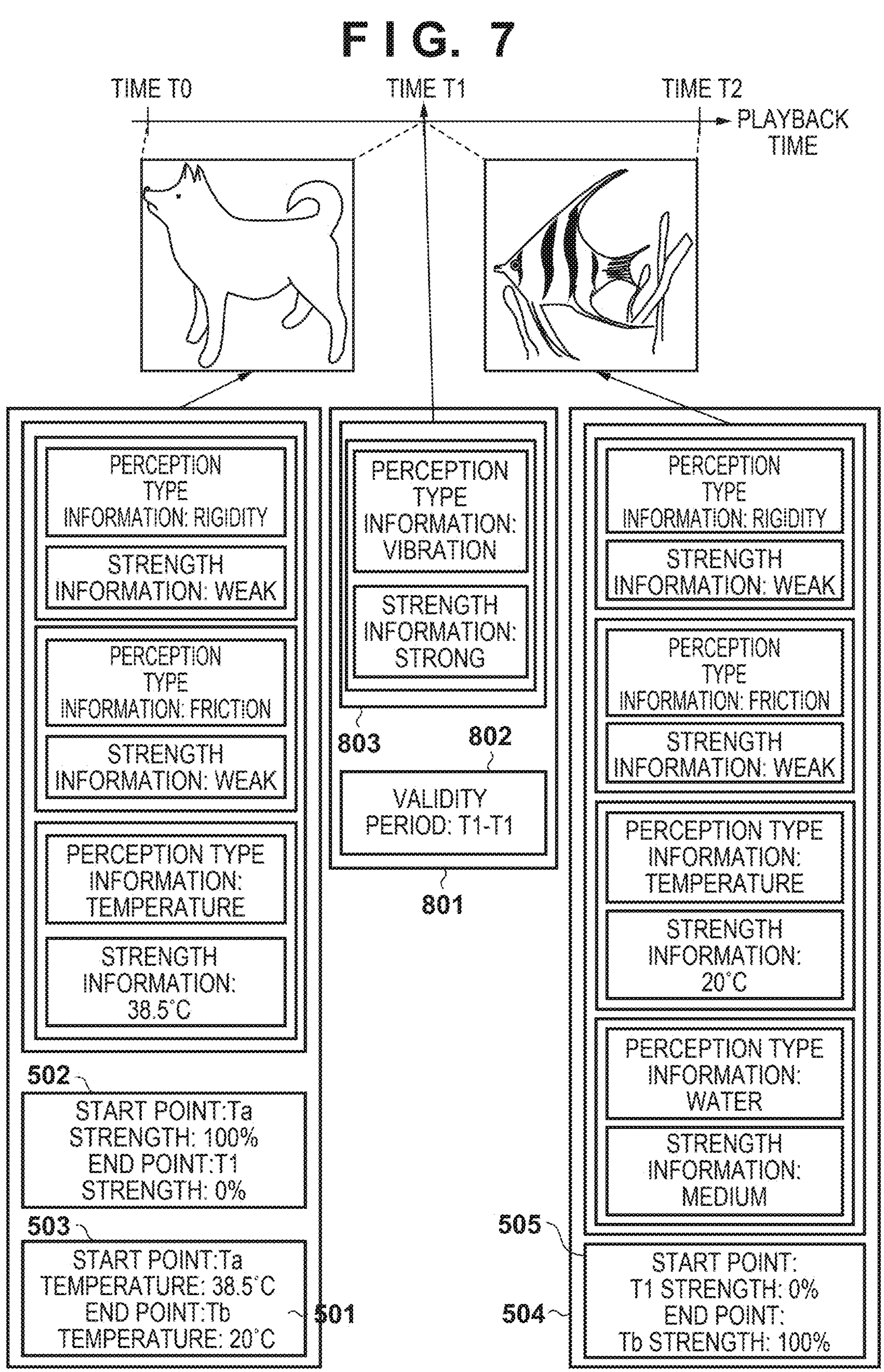

IMAGE PROCESSING DEVICE AND IMAGE PROCESSING METHOD

BACKGROUND

Field of the Disclosure

The present disclosure relates to an image processing device and an image processing method, and more particularly to an image processing device and an image processing method according to which it is possible to handle image data accompanied by information for reproducing a tactile sensation or force sensation.

Description of the Related Art

In recent years, haptics technology that elicits in a user a tactile sensation or force sensation has been attracting attention (WO 2021/009864A1). Haptics technology can provide a user with information that cannot be obtained through a sense of sight or a sense of hearing, such as information about a tactile quality or a hardness of an object.

For example, it is conceivable to record moving image data in association with information (haptics data) for eliciting a haptic sensation related to a subject in a user. By eliciting a tactile impression in a user through a known touch and force sense interface device that uses an actuator or the like during playback of moving image data, a richer user experience can be achieved.

SUMMARY

One aspect of the present disclosure provides an image processing device and an image processing method according to which it is possible to appropriately handle image data associated with information for reproducing a tactile impression of a subject.

According to an aspect of the present invention, there is provided an image processing device that edits moving image data having associated haptics data that elicits haptic sensation, the image processing device comprising one or more memories storing instructions; and one or more processors that, upon execution of the stored instructions, configures the one or more processors to function as: a detection unit configured to detect whether or not first and second haptics data respectively associated with first and second sections that are adjacent in a time direction in edited moving image data vary discontinuously; and an editing unit configured to modify the first and second haptics data so as to suppress the discontinuous variation when it is detected that the first and second haptics data vary discontinuously.

According to an aspect of the present invention, there is provided an image processing method to be executed by an image processing device, the image processing method being for editing moving image data with which haptics data for eliciting haptic sensation is associated, the method comprising: detecting whether or not first and second haptics data respectively associated with first and second sections that are adjacent in a time direction in edited moving image data vary discontinuously; and modifying the first and second haptics data so as to suppress the discontinuous variation when it is detected that the first and second haptics data vary discontinuously.

According to an aspect of the present invention, there is provided a non-transitory computer-readable medium that stores one or more programs that cause, when executed by a computer, the computer to perform an image processing method for editing moving image data with which haptics data for eliciting haptic sensation is associated, the method comprising: detecting whether or not first and second haptics data respectively associated with first and second sections that are adjacent in a time direction in edited moving image data vary discontinuously; and modifying the first and second haptics data so as to suppress the discontinuous variation when it is detected that the first and second haptics data vary discontinuously.

Further features of the present disclosure will become apparent from the following description of exemplary embodiments (with reference to the attached drawings).

BRIEF DESCRIPTION OF THE DRAWINGS

FIG. 3 is a schematic diagram showing a specific example of haptics data.

FIG. 6 is a flowchart showing an operation of modifying haptics data in the first embodiment.

FIG. 7 is a diagram for describing an example of a method for modifying haptics data in a second embodiment.

DESCRIPTION OF THE EMBODIMENTS

Figure 1:
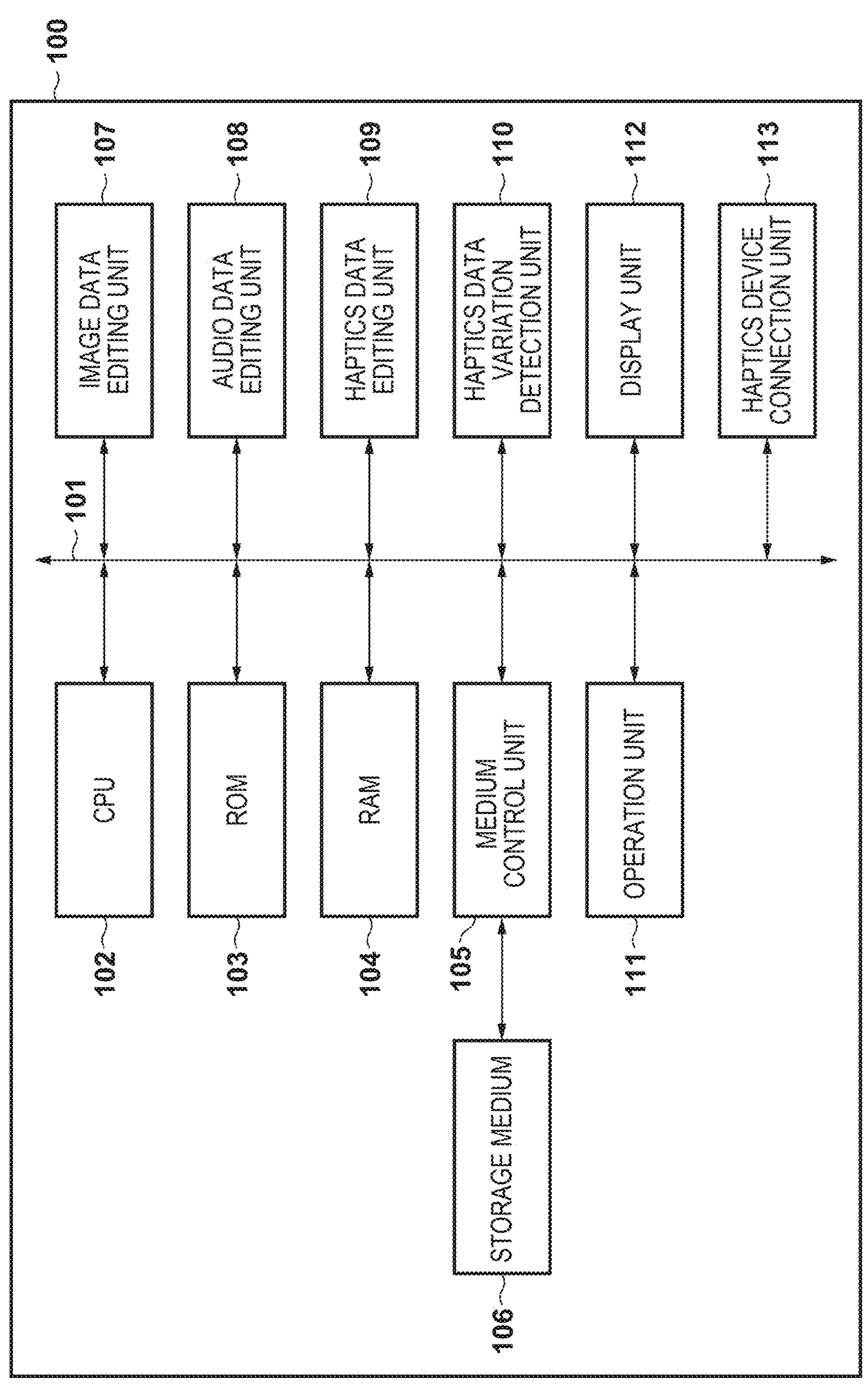
FIG. 1 is a block diagram showing an example of a functional configuration of an image processing device according to an embodiment.

Hereinafter, embodiments will be described in detail with reference to the attached drawings. Note, the following embodiments are not intended to limit the scope of the claimed invention. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an example of a functional configuration of an image processing device 100 according to an embodiment of the present disclosure. The image processing device 100 may be a computer device such as a desktop or notebook personal computer, or a tablet computer. The image processing device 100 can also be implemented in an electronic device having one or more processors capable of executing an application program, such as a digital camera, a media player, a mobile information terminal (PDA), a smartphone, or a game console.

The image processing device 100 handles information (haptics data) that represents a haptic sensation (a touch sensation, a force sensation, a temperature sensation, etc.), but does not need to have a sensor that acquires the haptics data or a haptic sensation interface device that reproduces the haptics data and elicits the haptic sensation in the user.

Before describing the functional configuration of the image processing device 100, the image data handled by the image processing device 100 will be described. The image data is data representing a still image or a moving image, but has haptics data associated therewith. There is no limitation on the method of association, but here it is assumed that the image data and the haptics data are stored in one data file using, for example, a known container format.

The haptics data may be stored in a data file separate from the data file in which the image data is stored. In this case, the association of the data files can be achieved with any known method, such as giving commonality to the file names of the two data files or including information specifying the associated data files as metadata or the like.

Haptics data is data for reproducing specific haptic sensation by controlling devices such as a motor, an actuator, a vibrator, and a heater of a haptic sensation interface device that elicits haptic sensations. The haptics data can be generated by a known technology based on values detected by various sensors. Also, the present disclosure does not depend on the method for generating haptics data or the configuration of the data. Accordingly, the content of the haptics data will be described only to the minimum extent necessary to implement the content of the disclosure.

Figure 2:
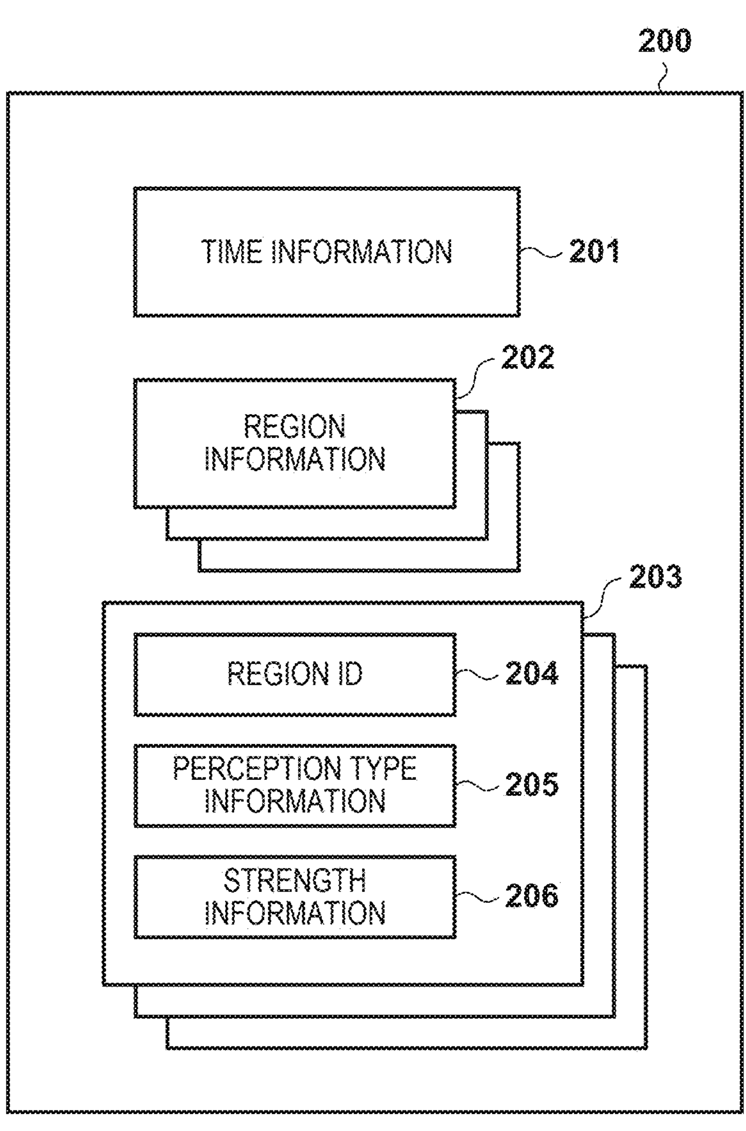
FIG. 2 is a schematic diagram showing an example of a configuration of haptics data.

FIG. 2 is a schematic diagram showing an example of the types and hierarchical relationships of information included in the haptics data handled in this embodiment.

The haptics data 200 includes time information 201, one or more pieces of region information 202, and one or more pieces of perception information 203.

If the haptics data 200 is associated with moving image data, the time information 201 may be a time code indicating a period during which the haptics data 200 is valid in the moving image. Also, if the haptics data 200 is associated with still image data, the time information 201 need not be present or may have a specific constant value indicating that the haptics data 200 is always valid. If the haptics data 200 is associated with a still image, the haptics data 200 can be considered valid when the associated still image is displayed.

In addition, if the validity period is controlled for each piece of perception information, which will be described later, there may be a plurality of pieces of time information 201. In this case, each piece of time information 201 has a unique time information ID. The time information 201 can also be used to designate variation over time in the output for the haptic sensation. Detailed description will be given later.

In this embodiment, the time information 201 is applied to the entire haptics data 200. However, if, for example, the validity period or the variation over time in the output for the haptic sensation is controlled independently according to the region, there may be a plurality of pieces of time information 201 including different region IDs.

Region information 202 is information that specifies a specific region in an image (such as a range of image coordinates, information designating one or more specific subject regions in the image) if the haptic sensation are to be elicited for that region. When image data is recorded, if information on the position and size of a specific subject region (e.g., a human body region) detected in the image is recorded as additional information, the information can be used as the region information 202. The type of data used as the region information 202 can vary depending on the method for recording the image data and the like. If no region is designated, the region information 202 can have information representing the entire screen, a predetermined specific value, or the like.

The region information 202 is recorded for each specific region, and each piece of region information 202 is assigned a unique management ID.

The perception information 203 includes a region ID 204, perception type information 205, and strength information 206. The region ID 204 is the management ID of the region information 202 targeted by the perception information 203. When the same perception is used in a plurality of regions, there are a plurality of region IDs 204.

The perception type information 205 is information that indicates the type of perception. The type of perception is not limited to the type of the perception itself, such as temperature, rigidity, or friction, and may also be the type of a specific object evoked by the perception, such as the sensation of wind or water. The strength information 206 indicates the strength of the perception.

Note that the strength of the perception can be varied over time using the time information 201. For example, a start point at which the strength is varied, the strength at that time, an end point, and the strength at that time are described in the time information 201. For example, the strength may be a percentage in which the strength described in the strength information 206 is taken as 100%. Also, the start point and the end point can be designated by time codes. Note that an actual value can be described instead of a percentage in the case of a perception type that is designated not by an "strength" but by a value [°C], such as temperature.

For example, a fade-out effect can be achieved for the output for the haptic sensation by setting the time code where the moving image data ends as the end point and the start point as a time code that is a predetermined amount of time before the end point, and setting the strength at the start point to 100% and the strength at the end point to a value less than 100%. Similarly, a fade-in effect can be achieved for the output for the haptic sensation by setting the time code where the moving image data begins as the start point and a time code that is a predetermined amount of time after the start point as the end point, and setting the strength at the end point to 100% and the strength at the starting point to a value less than 100%.

The description of how the output for the haptic sensation varies over time can be described separately from the description of the validity period. In addition, by including a region ID in the time information 201, it is possible to control the variation over time in the output for the haptic sensation for each region.

Note that the perception information 203 may also include information specific to the type of perception. Also, if a plurality of types of perception are presented for the same region, there are a plurality of pieces of perception information 203 including the same region ID 204.

The perception information 203 will be further described with reference to FIG. 3. FIG. 3 is a diagram showing an example of an image 300 and haptics data 303 corresponding to the image 300. The image 300 may be a frame of a moving image or a still image.

Here, an example of the configuration of the haptics data 303 is shown in which regions 301 and 302 of the image 300 are respectively targeted, and separate haptic sensations are elicited without time designation. The haptics data 303 does not include time information because the validity period of the haptics data is not designated.

The region information 304 and 305 have management IDs 0 and 1, respectively, and indicate the positions and sizes of the regions 301 and 302 in the image 300. For example, the region information 304 and 305 may be the image coordinates of the diagonal vertices of the respective regions 301 and 302.

Among the pieces of perception information 306 to 310, the pieces of perception information 306 and 307 with a region ID of 0 represent the haptic sensations elicited in relation to the region information 304. In addition, the pieces of perception information 308 to 310 with a region ID of 1 represent the haptic sensations presented in relation to the region 305.

Here, the perception information 306 represents the perception of strong rigidity, and the perception information 307 represents the perception of weak friction. For this reason, for region 301, a perception combining the two is provided, whereby haptic sensation of a hard, smooth object (the sensation of touching a marble sculpture) are provided.

For example, when an operation of selecting the region 301 is detected or a pointer such as a mouse cursor enters the region 301, a tactile sensation is elicited in the user through a haptic device such as an actuator included in a haptic sensation interface device held in the user's hand. Alternatively, for example, if the image processing device 100 is a tablet computer, when a touch operation on the region 301 is detected while the image 300 is being displayed on a touch display, a tactile sensation can be provided through a haptic device included in the image processing device 100. Note that the method for providing a tactile sensation described here is merely an example, and any other known method can be used.

Similarly, the perception information 308 represents the perception of weak rigidity, the perception information 309 represents the perception of weak friction, and the perception information 310 represents the perception of a temperature of about 38.5° C. For this reason, for the region 302, a perception combining these elements is provided, whereby the haptic sensation of a soft, smooth, and slightly warm object (the sensation of touching a dog) is elicited.

Note that the perception that is actually provided can vary depending on the capability of the haptic sensation interface. For example, if the haptic sensation interface does not have a temperature adjustment function, the perception information 310 regarding temperature is ignored.

Note that there is no particular limitation on the configuration of the haptics data, and the haptics data may have a structure or an element different from those of the examples described above. The haptics data may conform to a future standard or may use a proprietary format.

Returning to FIG. 1, the configuration of the image processing device 100 will be described. A CPU 102 is one or more processors capable of executing programs. The CPU 102 loads a program stored in, for example, a ROM 103 or a storage medium 106 into a RAM 104 and executes the loaded program. The CPU 102 executes the program and controls the operation of each functional block to realize the functions of the image processing device 100, including an image editing operation, which will be described later.

The ROM 103 is, for example, an electrically rewritable non-volatile memory, and stores programs executable by the CPU 102, setting values, GUI data, and the like.

The RAM 104 is used to load the programs to be executed by the CPU 102 and store values required during the execution of the programs. In addition, a part of the RAM 104 may be used as a moving image memory for the display unit 112.

The storage medium 106 has a larger storage capacity than the ROM 103, and stores basic software (OS), application programs, user data, and the like. Image data handled by the image processing device 100 and application programs for handling the image data are stored in the storage medium 106. The storage medium 106 may be, for example, a hard disk drive (HDD), a solid state drive (SSD), a removable memory card, or the like.

The medium control unit 105 follows instructions from the CPU 102 and controls writing of data to the storage medium 106 and reading of data from the storage medium 106. The medium control unit 105 reads data from the storage medium 106 in fixed size increments in accordance with a read command from the CPU 102 and stores the data in the RAM 104. In addition, the medium control unit 105 writes data to be written, which is stored in the RAM 104, into the storage medium 106 in fixed size increments in accordance with a write command from the CPU 102. When the medium control unit 105 completes reading or writing of data in accordance with the command, the medium control unit 105 notifies the CPU 102 of the completion. Note that the functions of the medium control unit 105 may also be executed by the CPU 102.

The operation unit 111 is an input device that can be operated by a user, and may be a keyboard, a mouse, a touch pad, or the like. In addition, the operation unit 111 may include an external input device. If the display unit 112 is a touch display, the touch panel of the display unit 112 is included in the operation unit 111. When the CPU 102 detects an operation on the operation unit 111, the CPU 102 executes an operation corresponding to the detected operation.

The display unit 112 displays a GUI (menus, windows, etc.) provided by the OS and application programs. The image data stored in the moving image memory region of the RAM 104 is displayed on the display unit 112. If the display unit 112 is a touch display, software keys can be realized by combining images displayed on the display unit 112 with the touch panel. Note that the display unit 112 does not need to be a constituent element of the image processing device 100, and may also be an external device.

An image data editing unit 107, an audio data editing unit 108, a haptics data editing unit 109, and a haptics data variation detection unit 110 provide a function for editing image data associated with haptics data. The processing described below as the operations of the functional blocks 107 to 110 may actually be realized by the CPU 102 executing an editing application program.

The image data editing unit 107 edits one or more pieces of image data to be edited, among the pieces of image data stored in the storage medium 106. Here, in exemplary operation the image data to be edited is moving image data, and editing the moving image data includes at least the following operations.

- Splitting one piece of moving image data into a plurality of pieces of moving image data,
- Combining a plurality of pieces of image data into one piece of moving image data, and
- Deleting part or all of a single piece of moving image data.

In addition to these operations, known operations such as adjusting color tone and brightness, and adding transitions (fade, dissolve, wipe, etc.) to combined portions may also be possible.

Moving image data is edited interactively by a user operating a GUI provided on a display unit 112 by an editing application executed by the CPU 102, via an operation unit 111. The CPU 102 edits the moving image data in accordance with the GUI operated via the operation unit 111 and the operation content, and displays the editing result. Since such editing of moving image data is known, further details will not be described here.

The audio data editing unit 108 and the haptics data editing unit 109 are capable of performing the same editing operations as the image data editing unit 107, except for operations that depend on the type of edited data.

The moving image data (including haptics data) being edited is temporarily stored in the RAM 104. When a save instruction from the user or an instruction to complete editing is detected, the CPU 102 stores the data stored in the RAM 104 in the storage medium 106 via the medium control unit 105.

The haptic device connection unit 113 is an interface for connecting a haptic sensation interface device that elicits the haptic sensation in the user based on haptics data. The haptics device connection unit 113 may be a communication interface that is generally used to communicably connect a computer device and an external device to each other, or may be a dedicated interface. The haptics device connection unit 113 can include, for example, one or more of a USB interface, a Bluetooth interface, an NFC interface, and the like.

The haptic sensation interface device may be, for example, a glove-like device having a device that generates vibration or pressure (a motor, actuator, vibrator, etc.) and a device with a variable temperature (a heater, Peltier element, etc.). When a user wears the haptic sensation interface device on his or her hand and touches the display unit 111, which is a touch display, output for eliciting haptic sensation corresponding to an image of the touched position is performed. For example, a user can experience the texture and temperature of a subject appearing in the image at the touched position.

Note that the image processing device 100 may have constituent elements such as a vibrator or an actuator that can be used as a haptic sensation interface device that elicits haptic sensation in a user through a housing and/or the display unit 112 of the image processing device 100. In this case, the components that can be used as a haptic sensation interface device may be considered to be connected to the haptics device connection unit 113.

The functional blocks other than the storage medium 106 are connected to each other via a bus 101 so as to be able to communicate with each other. The bus 101 includes an address bus, a data bus, and a control bus.

Next, modification of the haptics data executed by the haptics data editing unit 109 will be described. The haptics data editing unit 109 carries out modification to suppress discontinuity of the haptics data over time in order to suppress degradation of the quality of the user experience due to discontinuity of the haptics data that occurs, for example, at the combined portion of two pieces of moving image data.

Figure 4A:
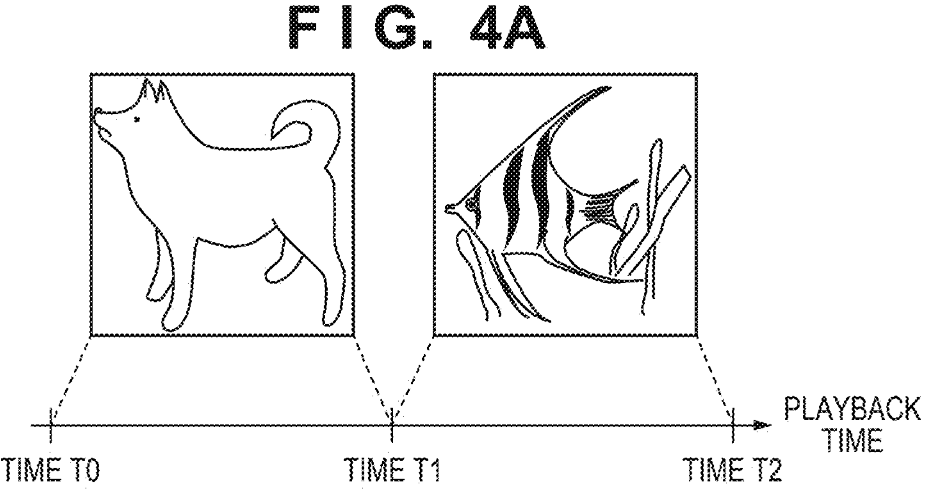
FIGS. 4A to 4C are diagrams for describing an example of a method for modifying haptics data in a first embodiment.

A specific example of a method for modifying haptics data will be described with reference to FIGS. 4A to 5. FIG. 4A schematically shows, for example, moving image data obtained by combining two pieces of moving image data, in which an image of a dog is shown from time T0 to just before T1, and an image of a fish is shown from time T1 to T2. Also, before the modification, it is assumed that the section from time T0 to just before T1 is associated with haptics data 501 (FIG. 5), and the section from time T1 to T2 is associated with haptics data 504. Time information 502, 503, and 505 in FIG. 5 are information that is added by modification, and will be described in detail later. For ease of description and understanding, it is assumed here that the haptics data 501 and 504 are for the entire frame images of a moving image.

The haptics data 501 associated with a video image of a dog presents a high body temperature of 38.5° C. and a soft texture, and therefore the haptics data 501 includes three pieces of perception information for which the perception type information is rigidity, friction, and temperature, respectively.

On the other hand, the haptics data 504 associated with the image of a fish presents a low body temperature of 20° C. and a slippery texture, and therefore the haptics data 504 includes four pieces of perception information for which the perception type information is rigidity, friction, temperature, and water (wetness), respectively.

When such a moving image is played back, the output for haptic sensations that are elicited varies significantly when the scene changes at time T1. For this reason, for example, if a user is touching the haptic sensation interface device and playback of a section that straddles time T1 is carried out, the tactile impression will suddenly vary with the scene switch at time T1, which is the boundary of the section, and there is a risk that this will surprise or cause discomfort to the user.

For this reason, in this embodiment, the haptics data variation detection unit 110 detects the timing at which the haptics data varies discontinuously. Then, the haptics data editing unit 109 modifies the haptics data so as to suppress discontinuous variation. This can improve the quality of the user experience when playing back moving image data associated with haptics data.

An example of a method for modifying haptics data carried out by the haptics data editing unit 109 will be further described with reference to FIGS. 4B and 4C. Here, it is assumed that the haptics data variation detection unit 110 detects that the haptics data varies discontinuously at time T1 for the moving image data shown in FIG. 4A. The haptics data variation detection unit 110 outputs a modification instruction including time T1 to the haptics data editing unit 109.

When the haptics data editing unit 109 receives a modification instruction from the haptics data variation detection unit 110, the haptics data editing unit 109 modifies the haptics data associated with the sections before and after time T1 so as to suppress the variation in the haptics data at time T1.

Specifically, the haptics data editing unit 109 modifies the haptics data associated with the section immediately prior to time T1 such that the strength of the output for the haptic sensation gradually decreases for a predetermined amount of time before time T1, starting from time Ta. Also, the haptics data editing unit 109 modifies the haptics data associated with the section including time T1 such that the strength of the output for the haptic sensation is lower than the original strength at time T1 and becomes the original strength at time Tb, which is a predetermined amount of time after time T1.

Figure 4B:
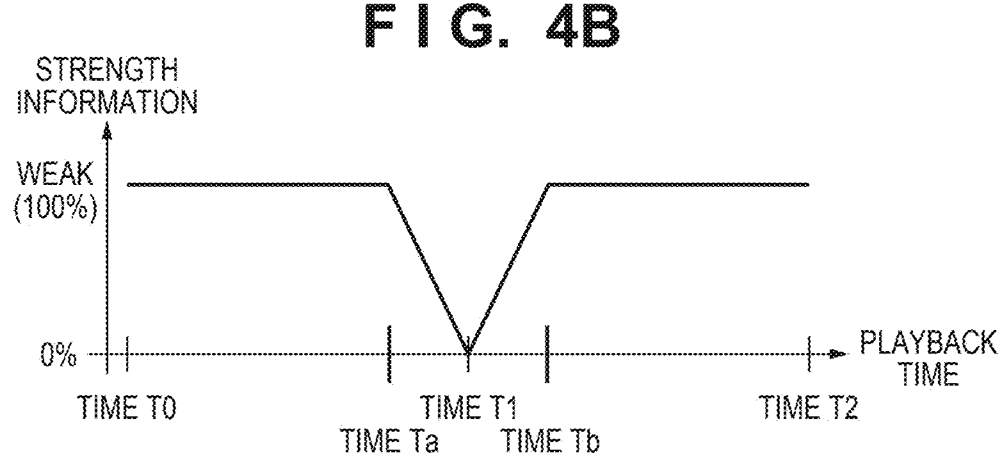
Figure 5:
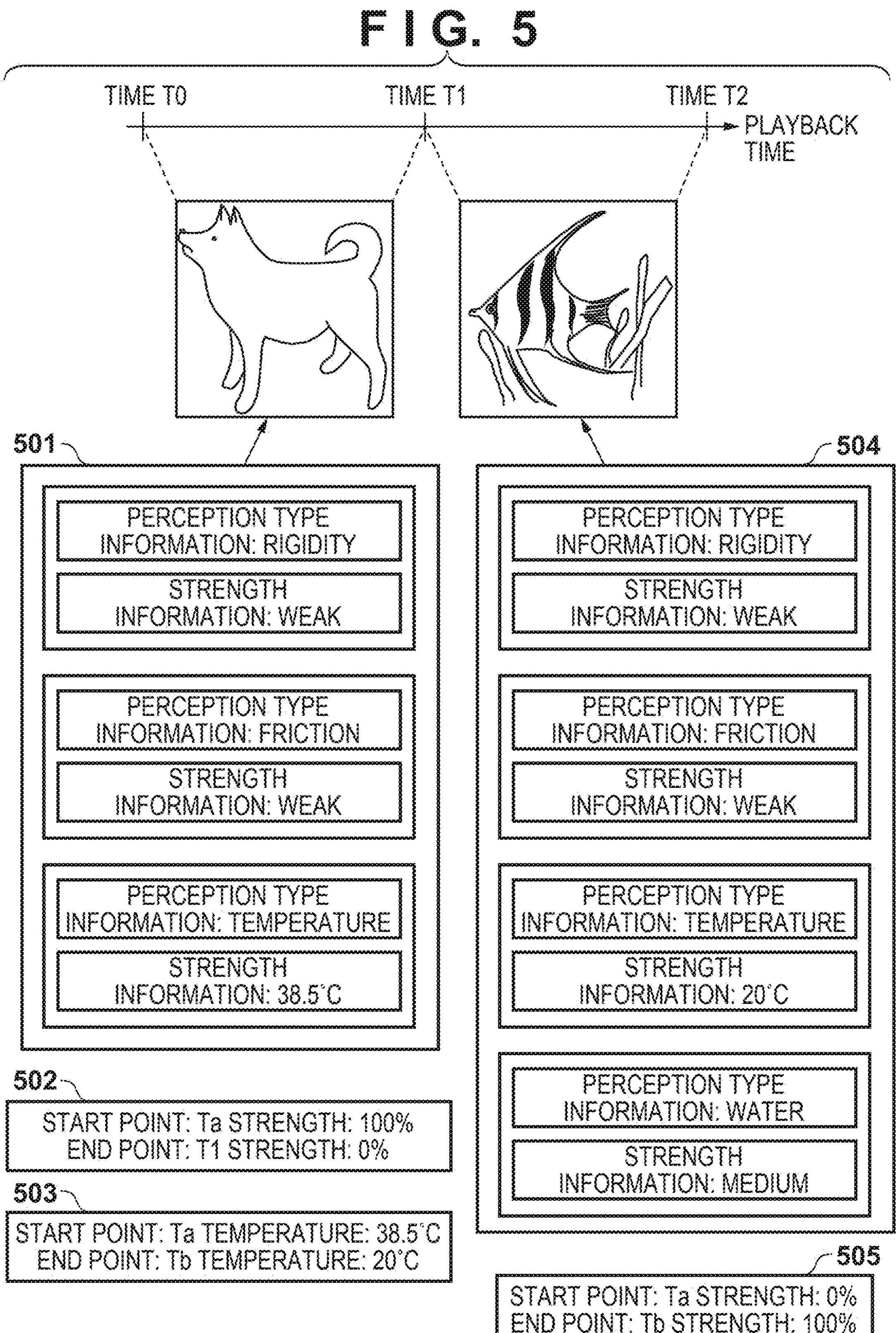
FIG. 5 is a diagram for describing an example of a method for modifying haptics data in the first embodiment.

FIG. 4B shows an example of such haptics data modification. Here, the modification is performed such that the output for the haptic sensation disappears (strength becomes 0%) at time T1, but the output does not necessarily need to be reduced to 0%. The respective periods during which strength control is carried out (the difference between time T1 and time Ta, and the difference between time T1 and time Tb) can be determined in advance. As an example, it can be about 1 to 3 seconds. The period during which the strength of the output for the haptic sensation is decreased and the period during which the strength is increased to the original strength may be of the same length or may be of different lengths.

Note that for perception information in which strength information is described by a specific value, such as temperature, the value corresponding to 0% in FIG. 4B is not necessarily a constant value. In addition, it may be difficult to achieve the strength variation shown in FIG. 4B. For this reason, a haptic sensation interface device that performs output for haptic sensation from haptics data may simply perform control to lower or raise the temperature for the section described in the time information.

Alternatively, for perception information in which strength information is described by a specific value, such as temperature, control may be performed by adding dedicated time information that describes the strength by a specific value. This allows independent control. For example, in the above example, while the strength control as shown in FIG. 4B is carried out for perception information other than temperature, the control as shown in FIG. 4C can be performed for perception information related to temperature.

Figure 4C:
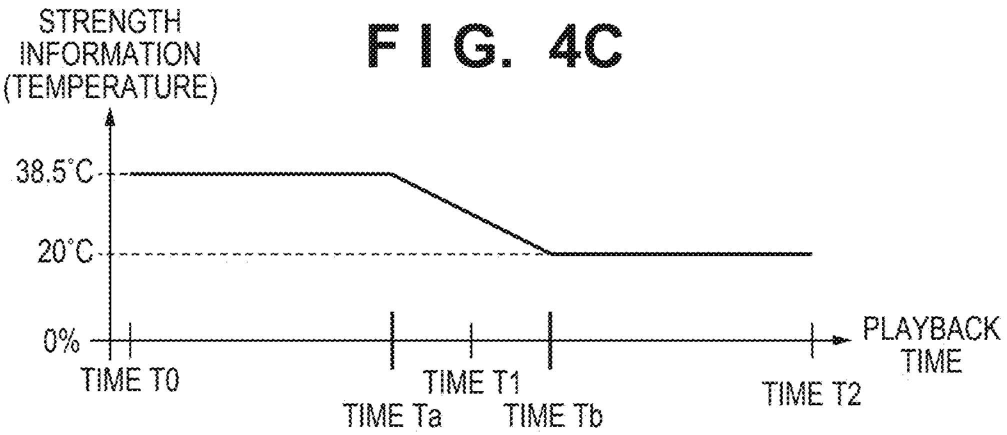

FIG. 4C shows output control for gradually reducing the temperature from 38.5° C. at time Ta so as to reach 20° C. at time Tb. Since it is difficult to control temperature to achieve a steep variation and the variation is less noticeable than with other tactile impressions, it is easier to achieve than output control such as that shown in FIG. 4B. Also, from the viewpoint of the quality of the user experience, the control in FIG. 4C is more preferable than the control in FIG. 4B in which the temperature variation is large.

As described above, the output for haptic sensation can be controlled over time using time information included in the haptics data. In the examples of FIGS. 4A to 5, the haptics data editing unit 109 newly adds time information for controlling the output for haptic sensation to the haptics data associated with each section.

FIG. 5 shows examples of time information 502, 503, and 505 that are added by the haptics data editing unit 109 when the control in FIG. 4B is performed for perception information other than temperature, and the control in FIG. 4C is performed for temperature.

The time information 502 and 505 realize output control for perception information in which strength information is indicated in levels (strong, medium, weak). Also, the time information 503 realizes output control for temperature. By describing in the time information 503 that the control is for temperature, the perception information to be controlled is specified. In this time information, Ta, Tb, and T1 describe the time codes of the corresponding times.

Note that the modification method described with reference to FIGS. 4A to 5 is merely an example. The output strength over time can be controlled using any other method according to which it is possible to suppress discontinuous variation in the output for haptic sensation based on haptics data.

Here, the description has been given assuming that the haptics data editing unit 109 modifies the haptics data in response to an instruction from the haptics data variation detection unit 110. However, the haptics data may also be edited according to other conditions. For example, the haptics data may be edited when the image data editing unit 107 adds a cross-fade (also called dissolve or overlap) transition to the moving image data. In this case, the haptics data editing unit 109 may modify the haptics data such that the strength of the output for the haptic sensation temporarily decreases in the same section as the cross-fade and then returns to the original strength.

The same also applies to the case where the image data editing unit 107 adds a fade-out or fade-in (that does not cross). That is, the haptics data editing unit 109 can control the strength of the output for the haptic sensation to gradually decrease during the fade-out section, or control the strength of the output for the haptic sensation to gradually increase from a strength weaker than the original strength to the original strength during the fade-in section. That is, when an effect involving variation over time in transparency is added to image data, the haptics data editing unit 109 can modify the haptics data such that the strength of the output for the haptic sensation varies over time, in the same manner as the transparency of the moving image data, for the section to which the effect was added.

When cross-fade, fade-out, or fade-in is added to audio data by the audio data editing unit 108, the haptics data may also be modified in a similar manner.

Note that for production reasons and the like, haptics data that varies discontinuously may be intentionally associated with consecutive sections. For this reason, the user may be able to set whether or not to allow the haptics data editing unit 109 to automatically modify the haptics data. This setting can be carried out by the user operating the operation unit 111 on a setting menu screen provided by an editing application program, for example. The setting content is stored in the storage medium 106 as setting information of the editing application, and can be referenced by the CPU 102.

The haptics data variation detection unit 110 detects discontinuous variation in the haptics data only when automatic editing of haptics data by the haptics data editing unit 109 is allowed. An example of a method in which the haptics data variation detection unit 110 detects discontinuous variation in the haptics data will be described below.

The processing for detecting discontinuous variation in the haptics data can be carried out at any timing. For example, this occurs when the image data editing unit 107 combines image data, when a part of one piece of image data is deleted, or when a user issues an instruction to execute detection processing.

The haptics data variation detection unit 110 can compare haptics data associated with adjacent sections in the time direction in the moving image data to be subjected to detection, and detect discontinuous variation in the haptics data according to a difference in the haptics data.

In the example shown in FIG. 5, the haptics data variation detection unit 110 compares the haptics data 501 and 504. The haptics data 501 and 504 have the same perception information regarding the types of rigidity and friction, as well as the same strength information. On the other hand, the perception information regarding the type of temperature is different, and perception information regarding water (moisture) is included only in the haptics data 504. In this way, if even one piece of perception information included in the haptics data associated with each of adjacent sections in the time direction is different, the haptics data variation detection unit 110 can determine that the haptics data varies discontinuously at the boundary of that section. Note that, for perception information for which strength information is expressed as a numerical value instead of in levels, such as temperature, the perception information may be considered to be the same if the difference between or ratio of the values before and after the variation is within a threshold range.

In the example of FIG. 5, the strength information of the perception information for temperature included in the haptics data 501 associated with the section immediately before time T1 (first section) and the haptics data 504 associated with the section including time T1 (second section) is 38.5° C. and 20° C., respectively. As an example, the threshold range for the difference is set to ±3, and the threshold range for the ratio is set to 0.75 to 1.25.

When evaluated by subtracting the value of the previous section from the value of the subsequent section, the difference is 19.5, which is outside the range of ±3. In addition, when evaluated based on the ratio of the value of the previous section to the value of the subsequent section, the ratio is 1.925, which exceeds the upper limit of the threshold. For this reason, the haptics data variation detection unit 110 determines that the perception information of the temperature is different.

When the strength information in the perception information of the temperature included in the haptics data 504 is 41° C., both the difference (−2.5) and the ratio (0.94) are within the threshold range. For this reason, the haptics data variation detection unit 110 determines that the temperature perception information in the previous and subsequent sections is the same (or that the variation does not require modification).

The above-mentioned operation for modifying the haptics data, which is carried out by the image processing device 100, will be described with reference to the flowchart of FIG. 6. The operations described below are realized by the CPU 102 executing an editing application program. Also, as described above, the operations of the image data editing unit 107, the audio data editing unit 108, the haptics data editing unit 109, and the haptics data variation detection unit 110 may also be realized by the CPU 102 executing an editing application program.

It is assumed here that an editing application program is running on the image processing device 100, moving image data to be edited is open, and an editing screen is being displayed on the display unit 112.

In step S600, the CPU 102 determines whether or not a data combining instruction or a section deletion instruction has been input via the operation unit 111. If it is determined that a data combining instruction or a section deleting instruction has been input, the CPU 102 executes step S601, and if not, the CPU 102 repeatedly executes step S600. When input of an editing instruction other than a data combining instruction or a section deletion instruction is detected, the CPU 102 executes an operation corresponding to the instruction and then executes step S600.

In step S601, the CPU 102 determines whether or not modification of the haptics data is allowed, and if it is determined that modification of the haptics data is allowed, the CPU 102 executes step S602, and if not, the CPU 102 executes step S605. The CPU 102 can determine whether or not modification of the haptics data is allowed by referring to the setting information of the editing application program.

In step S602, the CPU 102 executes combining processing or section deletion processing according to the instruction. The section deletion processing can be said to be a type of combining processing since it includes processing for combining the moving image data of sections before and after a deleted section. The haptics data variation detection unit 110 compares the haptics data associated with the sections before and after the combining location for the processed moving image data.

In step S603, the haptics data variation detection unit 110 determines whether or not the haptics data associated with the sections before and after the combining location varies discontinuously. If it is determined that the haptics data associated with the sections before and after the combining location varies discontinuously, the haptics data variation detection unit 110 proceeds to step S604, and if not, the haptics data variation detection unit 110 proceeds to the processing of step S605.

In step S604, the haptics data variation detection unit 110 outputs a modification instruction including information specifying the combining location to the haptics data editing unit 109. The haptics data editing unit 109 modifies the haptics data associated with the sections before and after the combining location as described above.

In step S605, the CPU 102 temporarily stores the edited moving image data (including audio data and haptics data) in the RAM 104, and then stores the edited moving image data in the storage medium 106 via the medium control unit 105.

As described above, in this embodiment, the haptics data is automatically modified to suppress variation in the output for the haptic sensation before and after the data combining location caused by editing the moving image data with which the haptics data is associated. For this reason, it is possible to reduce the likelihood that the output for the haptic sensation provided in conjunction with playback of edited moving image data will surprise or cause discomfort to the user, and thus it is possible to improve the quality of the user experience.

Note that detection of variation in the haptics data and modification of the haptics data need not be executed in real time during editing processing. After the editing is complete, the haptics data associated with the moving image data may be checked by the haptics data variation detection unit 110, and the haptics data may be modified collectively regarding the locations where the variation in the haptics data is detected.

Second Embodiment

Next, a second embodiment of the present disclosure will be described. This embodiment is the same as the first embodiment except for the operation of the haptics data editing unit 109. For this reason, the following description will focus on the operation of the haptics data editing unit 109 in this embodiment, and the content described in the first embodiment will be omitted.

In this embodiment, in addition to the functions described in the first embodiment, the haptics data editing unit 109 has a function of associating new haptics data with a combining location of image data. The haptics data editing unit 109 can associate haptics data that elicits a clicking sensation, for example, with a combining location of moving image data.

FIG. 7 is a diagram showing a state in which haptics data 801 that elicits a clicking sensation to the combining location (time T1) is associated with the moving image data illustrated in FIG. 5. The haptics data 801 includes time information 802 and perception information 803. The haptics data editing unit 109 associates the haptics data 801 with time T1 by setting both the start point and end point of the validity period of the time information 802 to T1.

The perception information 803 indicates strong vibration. When the moving image data is played back, a strong vibration is output for a short period of time from the haptic sensation interface device at time T1, and a clicking sensation can be elicited in the user. The user is notified of the occurrence of a scene change by the clicking sensation, and can prepare for the variation in the output for the haptic sensation caused by the scene change. This makes it possible to reduce surprise and discomfort caused by the variation in the output for the haptic sensation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-207851, filed Dec. 8, 2023, which is hereby incorporated by reference herein in its entirety.

What is claimed is:

1. An image processing device that edits moving image data having associated haptics data that elicits haptic sensation, the image processing device comprising one or more memories storing instructions; and one or more processors that, upon execution of the stored instructions, causes the image processing device to:

detect whether or not first and second haptics data respectively associated with first and second sections that are adjacent in a time direction in edited moving image data vary discontinuously; and modify the first and second haptics data so as to suppress the discontinuous variation when it is detected that the first and second haptics data vary discontinuously, wherein the first and second haptics data include perception information provided for each type of haptic sensation that is elicited by respective haptics data, and the execution of the stored instruction further causes the image processing apparatus to detect a presence of discontinuous variation between the first and second haptics data by comparing the perception information respectively included in the first and second haptics data.

2. The image processing device according to claim 1, wherein the image processing apparatus detects that the first and second haptics data vary discontinuously if at least one piece of the perception information included in the first haptics data is different from the perception information included in the second haptics data.

3. The image processing device according to claim 1, wherein the image processing apparatus modifies the first haptics data such that a strength of output of haptic sensation based on the first haptics data decreases gradually from before a boundary between the first and second sections.

4. The image processing device according to claim 1, wherein each of the first and second haptics data include perception information provided for each type of haptic sensation that is elicited, and the image processing apparatus modifies the second haptics data such that a strength of the haptic sensation based on the second haptics data is smaller than a strength designated by the perception information included in the second haptics data and gradually increases to become the designated strength at a boundary between the first and second sections.

5. The image processing device according to claim 1, wherein each of the first and second haptics data include perception information provided for each type of haptic sensation that is elicited, and the image processing apparatus modifies the first and second haptics data so as to vary from a strength designated by the perception information included in the first haptics data to a strength designated by the perception information included in the second haptics data during a period from a first time prior to a boundary between the first and second sections to a second time after the boundary.

6. The image processing device according to claim 1, wherein the image processing apparatus changes a method for modifying the haptics data according to a type of haptic sensation.

7. The image processing device according to claim 1, wherein each of the first and second haptics data include perception information provided for each type of haptic sensation that is elicited, and the perception information includes a type of haptic sensation and strength information, and the strength information indicates a level of strength or a value of the haptic sensation.

8. The image processing device according to claim 7, wherein the type of the haptic sensation is rigidity, friction, temperature, or a type of an object evoked by haptic sensation.

9. The image processing device according to claim 1, wherein each of the first and second haptics data include (i) perception information provided for each type of haptic sensation to be elicited and (ii) time information indicating a period during which output for haptic sensation based on the perception information is valid, and the image processing apparatus modifies the first and second haptics data by including a description designating variation over time in strength of the output for the haptic sensation in the time information.

10. The image processing device according to claim 1, wherein if an effect accompanying variation over time in transparency has been added to the moving image data by the editing, the image processing apparatus modifies haptics data associated therewith to a period where the effect has been added such that the strength of the output for the haptic sensation varies over time in a same manner as the transparency of the moving image data.

11. The image processing device according to claim 10, wherein the effect accompanying the variation over time in the transparency is a cross-fade, a fade-in, or a fade-out.

12. An image processing method to be executed by an image processing device, the image processing method being for editing moving image data with which haptics data for eliciting haptic sensation is associated, the method comprising:

detecting whether or not first and second haptics data respectively associated with first and second sections that are adjacent in a time direction in edited moving image data vary discontinuously; and modifying the first and second haptics data so as to suppress the discontinuous variation when it is detected that the first and second haptics data vary discontinuously, wherein the first and second haptics data include perception information provided for each type of haptic sensation that is elicited by respective haptics data, and the method further comprises detecting a presence of discontinuous variation between the first and second haptics data by comparing the perception information respectively included in the first and second haptics data.

13. A non-transitory computer-readable medium that stores one or more programs that cause, when executed by a computer, the computer to perform an image processing method for editing moving image data with which haptics data for eliciting haptic sensation is associated, the method comprising:

detecting whether or not first and second haptics data respectively associated with first and second sections that are adjacent in a time direction in edited moving image data vary discontinuously; and modifying the first and second haptics data so as to suppress the discontinuous variation when it is detected that the first and second haptics data vary discontinuously, wherein the first and second haptics data include perception information provided for each type of haptic sensation that is elicited by respective haptics data, and the method further comprises detecting a presence of discontinuous variation between the first and second haptics data by comparing the perception information respectively included in the first and second haptics data.

* * * * *